US009875755B2

(12) United States Patent
Nakadai et al.

(10) Patent No.: US 9,875,755 B2
(45) Date of Patent: Jan. 23, 2018

(54) VOICE ENHANCEMENT DEVICE AND VOICE ENHANCEMENT METHOD

(71) Applicant: HONDA MOTOR CO., LTD., Tokyo (JP)

(72) Inventors: Kazuhiro Nakadai, Wako (JP); Takeshi Mizumoto, Wako (JP); Keisuke Nakamura, Wako (JP); Masayuki Takigahira, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/173,922

(22) Filed: Jun. 6, 2016

(65) Prior Publication Data

US 2016/0372132 A1 Dec. 22, 2016

(30) Foreign Application Priority Data

Jun. 17, 2015 (JP) ................................ 2015-122045

(51) Int. Cl.
*H04B 1/00* (2006.01)
*G10L 21/0232* (2013.01)

(52) U.S. Cl.
CPC ................................ *G10L 21/0232* (2013.01)

(58) Field of Classification Search
None
See application file for complete search history.

(56) References Cited

U.S. PATENT DOCUMENTS

2008/0292107 A1* 11/2008 Bizjak ...................... H04R 3/00 381/56
2012/0095753 A1* 4/2012 Nakajima .......... G10L 21/0208 704/200
2015/0010162 A1* 1/2015 Lasch ...................... H03G 3/32 381/71.4

FOREIGN PATENT DOCUMENTS

JP 2012-088404 5/2012

* cited by examiner

*Primary Examiner* — Joseph Saunders, Jr.
*Assistant Examiner* — James Mooney
(74) *Attorney, Agent, or Firm* — Rankin, Hill & Clark LLP

(57) ABSTRACT

A voice enhancement device includes: a sound receiving unit configured to receive an audio signal; a vehicle state monitor unit configured to monitor a vehicle state; a noise estimation unit configured to estimate a noise component for each frequency component using a cumulative histogram created by accumulating frequency of power of the audio signal received by the sound receiving unit for each frequency component; and a voice enhancer configured to suppress the noise component for each frequency component estimated by the noise estimation unit in the received audio signal, wherein the noise estimation unit resets the cumulative histogram on the basis of a monitoring result of the vehicle state monitor unit.

7 Claims, 7 Drawing Sheets

| VEHICLE STATE | | DEFAULT CUMULATIVE HISTOGRAM | THRESHOLD VALUE $S_X$ |
|---|---|---|---|
| POWER WINDOW | OPEN | DEFAULT 1 | $S_{x1}$ |
| | CLOSE | DEFAULT 2 | $S_{x2}$ |
| DOOR | OPEN | DEFAULT 3 | $S_{x3}$ |
| | CLOSE | DEFAULT 4 | $S_{x4}$ |
| BRAKE | STOP | DEFAULT 5 | $S_{x5}$ |
| | START | DEFAULT 6 | $S_{x6}$ |

VOICE ENHANCEMENT DEVICE AND VOICE ENHANCEMENT METHOD

CROSS-REFERENCE TO RELATED APPLICATION

Priority is claimed on Japanese Patent Application No. 2015-122045, filed on Jun. 17, 2015, the content of which is incorporated herein by reference.

BACKGROUND

Field of the Invention

The present invention relates to a voice enhancement device and a voice enhancement method.

Background

A voice enhancement device that suppresses a noise component contained in an audio signal is known in the art. For example, a voice enhancement device applied to a mobile phone or the like during a hands-free call or a call in an outdoor environment has been proposed.

In such a voice enhancement device, a cumulative histogram is created for each frequency and for each power of an audio signal received by a sound detector, and a noise level is estimated on the basis of the created cumulative histogram. In addition, the voice enhancement device performs voice enhancement through spectral subtraction by subtracting a noise component based on the estimated noise level from a voice signal contained in the received audio signal (for example, see Japanese Unexamined Patent Application, First Publication No. 2012-88404). Note that the spectral subtraction is a process of subtracting a noise component from a voice signal on the basis of a frequency.

SUMMARY

However, when the technique discussed in Japanese Unexamined Patent Application, First Publication No. 2012-88404 is applied to, for example, a vehicle having a variable state of the noise component, the cumulative histogram may not be properly created. Further, a vehicle has a noise component which is variable, for example, depending on a state in which a door is open, a state in which a door is closed, and the like. In the technique discussed in Japanese Unexamined Patent Application, First Publication No. 2012-88404, noise suppression may not be properly performed under such an environment in which the noise component is variable.

In view of the aforementioned problems, it is an object of an aspect of the present invention to provide a voice enhancement device and a voice enhancement method capable of properly performing noise suppression.

(1) According to an aspect of the present invention, there is provided a voice enhancement device including: a sound receiving unit configured to receive an audio signal; a vehicle state monitor unit configured to monitor a vehicle state; a noise estimation unit configured to estimate a noise component for each frequency component using a cumulative histogram created by accumulating frequency of power of the audio signal received by the sound receiving unit for each frequency component; and a voice enhancer configured to suppress the noise component for each frequency component estimated by the noise estimation unit in the received audio signal, wherein the noise estimation unit resets the cumulative histogram on the basis of a monitoring result of the vehicle state monitor unit.

(2) In the aspect of (1) described above, the noise estimation unit may reset the cumulative histogram when the monitoring result of the vehicle state monitor unit is changed.

(3) In the aspect of (1) or (2) described above, the voice enhancement device may include a histogram memory unit configured to store the cumulative histogram on the basis of the vehicle state, wherein the noise estimation unit may read the cumulative histogram for each frequency component depending on the vehicle state from the histogram memory unit on the basis of the monitoring result of the vehicle state monitor unit after the reset and may estimate the noise component for each frequency component using the read cumulative histogram for each frequency component.

(4) In the aspect of (3) described above, the histogram memory unit may store a threshold value for determining the noise component on the cumulative histogram in combination with the vehicle state, and the noise estimation unit may estimate the noise component for each frequency component using the threshold value stored in the histogram memory unit.

(5) In the aspect of any one of (1) to (4) described above, the vehicle state in which the cumulative histogram is reset may include at least one of a start operation and a stop operation of the vehicle.

(6) In the aspect of any one of (1) to (4) described above, the vehicle state in which the cumulative histogram is reset may include a door open/close operation of the vehicle.

(7) In the aspect of any one of (1) to (4) described above, the vehicle state in which the cumulative histogram is reset may include a window open/close operation of the vehicle.

(8) According to another aspect of the invention, there is provided a voice enhancement method including: (a) receiving, by a sound receiving unit, an audio signal; (b) monitoring, by a vehicle state monitor unit, a vehicle state; (c) estimating, by a noise estimation unit, a noise component for each frequency component using a cumulative histogram for each frequency component created by accumulating frequency of power of the audio signal received in (a) and resetting the cumulative histogram on the basis of a result monitored in (b); and (d) suppressing, by a voice enhancer, the noise component for each frequency component estimated by the noise estimation unit in the audio signal received in (a).

In the configurations described above in (1) and (8), it is possible to properly perform noise suppression even when a vehicle state is changed.

In the configuration described above in (2), it is possible to properly perform noise suppression even when a noise state inside a vehicle is changed.

In the configuration described above in (3), it is possible to immediately perform proper noise suppression using the cumulative histogram stored in the histogram memory unit even when an environment is changed.

In the configuration described above in (4), it is possible to properly perform noise suppression even when a relationship between a noise power level and a speech power level changes.

In the configurations described above in (5), (6), and (7), it is possible to properly perform noise suppression even when a magnitude relationship of the noise component inside a vehicle is changed by the vehicle state.

DESCRIPTION OF THE EMBODIMENTS

The embodiments of the invention will now be described with reference to the accompanying drawings. In the following description, an exemplary case in which a voice enhancement device is installed in a vehicle will be described.

<Configuration of Voice Enhancement Device>

Figure 1:
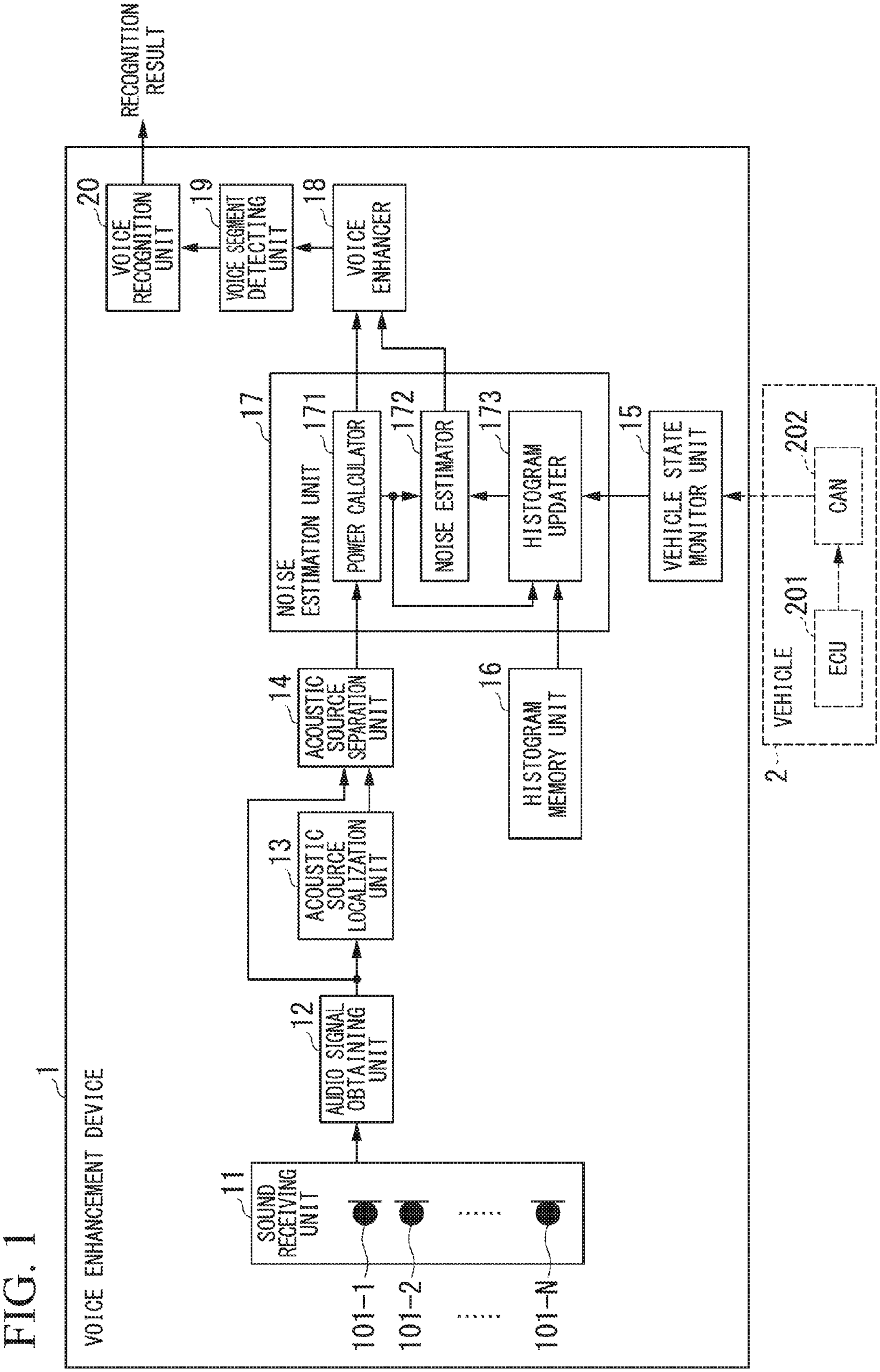
FIG. 1 is a block diagram illustrating a configuration of an audio enhancement device according to an embodiment.

FIG. 1 is a block diagram illustrating a configuration of an audio enhancement device 1 according to this embodiment.

As illustrated in FIG. 1, the audio enhancement device 1 includes a sound receiving unit 11, an audio signal obtaining unit 12, an acoustic source localization unit 13, an acoustic source separation unit 14, a vehicle state monitor unit 15, a histogram memory unit 16, a noise estimation unit 17, a voice enhancer 18, a voice segment detecting unit 19, and a voice recognition unit 20. The audio enhancement device 1 is provided in a vehicle 2. The vehicle 2 includes an electronic control unit (ECU) 201 and a control area network (CAN) 202. Note that, in the following description, an example is described in which only one person as a driver of the vehicle 2 speaks.

The ECU 201 detects that a user manipulates each functional operation in the vehicle 2 and controls the vehicle 2 depending on the detection result. The functional operations include a power window open/close operation, a door open/close operation, a brake operation, and the like. The ECU 201 outputs vehicle information representing the detection result to the audio enhancement device 1 through the CAN 202. Note that the detection information includes information representing a vehicle state. Here, the vehicle state is one of a state in which a power window is open, a state in which a power window is closed, a state in which a door is open, a state in which a door is closed, a state in which a brake is stopped, a state in which a brake is operated, or the like.

The CAN 202 is a network used in data transmission between devices connected to each other in compliance with the CAN standard.

The sound receiving unit 11 is a microphone including microphones 101-1 to 101-N (where "N" denotes an integer equal to or greater than "2"). Further, the sound receiving unit 11 is, for example, a microphone array. The sound receiving unit 11 is installed, for example, between a driver's seat and an assistant driver's seat of the vehicle 2. Further, when none of the microphones 101-1 to 101-N is designated particularly, they will be collectively referred to as a microphone 101. The sound receiving unit 11 converts the received audio signal into an electric signal and outputs the converted audio signal to the audio signal obtaining unit 12. Note that the sound receiving unit 11 may transmit the audio signal recorded in N channels to the audio signal obtaining unit 12 in a wireless or wired manner. The audio signals may be synchronized between channels during transmission.

The audio signal obtaining unit 12 obtains the N audio signals recorded by the N microphones 101 of the sound receiving unit 11 and outputs the obtained N audio signals to the acoustic source localization unit 13 and the acoustic source separation unit 14.

The acoustic source localization unit 13 stores transfer functions from the microphone 101 to a predetermined position on the basis of an azimuth orientation. The acoustic source localization unit 13 estimates an azimuth angle of an acoustic source for the N audio signals input from the audio signal obtaining unit 12 using the transfer functions stored therein (this process is also referred to as "acoustic source localization"). The acoustic source localization unit 13 outputs the estimated azimuth angle information of the acoustic source to the acoustic source separation unit 14. The acoustic source localization unit 13 estimates the azimuth angle, for example, using a multiple signal classification (MUSIC) method. Note the azimuth angle may be estimated using other acoustic source orientation estimation methods such as a beam forming method, a weighted delay and sum beam forming (WDS-BF) method, or a generalized singular value decomposition-multiple signal classification (GSVD-MUSIC) method.

The acoustic source separation unit 14 stores transfer functions from the microphone 101 to a predetermined position on the basis of an azimuth orientation. The acoustic source separation unit 14 obtains the N audio signals output by the audio signal obtaining unit 12 and azimuth angle information of the acoustic source output by the acoustic source localization unit 13. The acoustic source separation unit 14 reads a transfer function corresponding to the obtained azimuth angle out of the transfer functions stored therein. The acoustic source separation unit 14 separates a voice signal y(t) of a person speaking from the obtained N audio signals using the read transfer function and a hybrid method between blind source separation and beam forming, such as a geometrically constrained high order de-correlation based source separation with adaptive step size control (GHDSS-AS) method. Note that the acoustic source separation unit 14 may perform the acoustic source separation process, for example, using a beam forming method. The acoustic source separation unit 14 outputs the voice signal y(t) for each separated acoustic source to the noise estimation unit 17.

The vehicle state monitor unit 15 extracts vehicle state information contained in vehicle information output by the vehicle 2. When it is detected that the vehicle state is changed on the basis of the extracted vehicle state information, the vehicle state monitor unit 15 resets a cumulative histogram (frequency distribution) and generates a reset instruction for reading a default cumulative histogram corresponding to the vehicle state from the histogram memory unit 16. The vehicle state monitor unit 15 outputs the generated reset instruction to the noise estimation unit 17. Further, the reset instruction contains the vehicle state information.

Figures 2, 3:
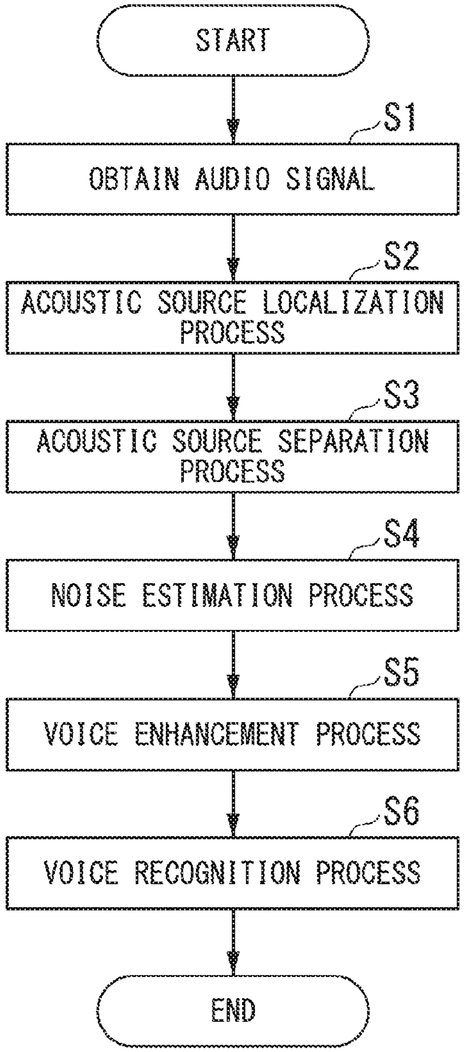
FIG. 2 is a diagram illustrating an example of information stored in a histogram memory unit in combination with a vehicle state according to an embodiment.
FIG. 3 is a flowchart illustrating a process performed by an audio enhancement device according to an embodiment.

As illustrated in FIG. 2, the histogram memory unit 16 stores default cumulative histograms on the basis of a vehicle state in combination with threshold values $S_x$, which will be described below.

FIG. 2 is a diagram illustrating an example of information stored in the histogram memory unit 16 in combination with vehicle states according to this embodiment. As illustrated in FIG. 2, for example, for a state in which a power window is open, a cumulative histogram of DEFAULT 1 is matched with a threshold value $S_{x1}$. In addition, for a state in which a power window is closed, a cumulative histogram of DEFAULT 2 is matched with a threshold value $S_{x2}$. Note that each default cumulative histogram is a frequency-based cumulative histogram. Note that the example of FIG. 2 is only for exemplary purposes, and the vehicle state is not limited thereto. For example, the default cumulative histogram may be matched with a power window open rate or a vehicle travel speed.

Returning to FIG. 1, the description of the audio enhancement device 1 will be continued.

The noise estimation unit 17 includes a power calculator 171, a noise estimator 172, and a histogram updater 173.

The power calculator 171 transforms the voice signal y(t) for each acoustic source output by the acoustic source separation unit 14 into a complex input spectrum Y(k, l) expressed in a frequency domain. Note that "k" denotes an index representing a frequency, and "l" denotes an index representing each frame. For example, the power calculator 171 performs a discrete Fourier transform (DFT) for the audio signal y(t), for example, for each frame 1. The power calculator 171 may multiply the audio signal y(t) by a window function (for example, a Hamming window) to transform the voice signal multiplied by the window function into the complex input spectrum Y(k, l) expressed in a frequency domain.

The power calculator 171 calculates a power spectrum $|Y(k,l)|^2$ based on the complex input spectrum Y(k, l) for each acoustic source. In the following description, the power spectrum may be simply referred to as a "power." Here, "| . . . |" denotes an absolute value of a complex number " . . . ". The power calculator 171 outputs the calculated power spectrum $|Y(k,l)|^2$ for each acoustic source to the noise estimator 172, the histogram updater 173, and the voice enhancer 18.

The noise estimator 172 calculates a noise power spectrum λ(k, l) included in the power spectrum $|Y(k,l)|^2$ for each acoustic source input from the power calculator 171 using the cumulative histogram updated by the histogram updater 173 for each acoustic source. In the following description, the noise power spectrum λ(k, l) may be referred to as a "noise power λ(k, l)." The noise estimator 172 calculates the noise power λ(k, l) on the basis of a frequency using the cumulative histogram, for example, according to a histogram-based recursive level estimation (HRLE) method (for example, see Robot Audition—*Hands-Free Automatic Voice Recognition under Highly-Noisy Environments*—, written by *Kazuhiro NAKADAI and Hiroshi G. OKUNO*, from *the Institute of Electronics, Information and Communication Engineers*, Technical Report of IEICE, 2011). The noise estimator 172 outputs the calculated noise power λ(k, l) for each acoustic source to the voice enhancer 18. In the HRLE method, the histogram of the power spectrum $|Y(k, l)|^2$ in a logarithmic domain is calculated on the basis of a frequency, and the noise power λ(k, l) is calculated for each frequency on the basis of a cumulative distribution thereof and a predetermined threshold value $S_x$.

The process of calculating the noise power λ(k, l) using the HRLE method will be described below.

The histogram updater 173 resets the frequency-based cumulative histogram used in the noise estimation in response to the reset instruction output by the vehicle state monitor unit 15. Subsequently, the histogram updater 173 reads the default frequency-based cumulative histogram depending on the vehicle state included in the reset instruction from the histogram memory unit 16 and changes the frequency-based cumulative histogram used in the noise estimation. In addition, the histogram updater 173 updates each frequency-based cumulative histogram using the power spectrum output by the power calculator 171 for a time period in which the vehicle state is not changed. Note that the cumulative histogram will be described below.

The voice enhancer 18 calculates a spectrum of the voice signal with a noise component being suppressed (complex noise-free spectrum) by performing subtraction or a subtraction-like operation on the basis of a frequency, in which the noise power λ(k, l) output by the noise estimation unit 17 is subtracted from the power spectrum $|Y(k, l)|^2$ output by the power calculator 171. As a result, the voice enhancer 18 suppresses a noise component that is not easily separated through the acoustic source separation process, such as dispersive noise, relative to a voice signal.

The voice enhancer 18 calculates a gain Gss(k, l), for example, using the power spectrum $|Y(k, l)|^2$ and the noise power λ(k, l) on the basis of the following Formula (1).

[Formula 1]

$$G_{SS}(k,l) = \max\left[\sqrt{\frac{|Y(k,l)^2 - \lambda(k,l)|}{|Y(k,l)^2|}},\ \beta\right] \tag{1}$$

In Formula (1), "max(α, β)" denotes a function that outputs the greater number out of real numbers α and β. "β" denotes a minimum value of the predetermined gain Gss(k, l). Here, the left term of the function "max( . . . )" (the real number a) represents a square root of a ratio of a noise-free power spectrum $\{|Y(k, l)|^2-\lambda(k, l)\}$ for a frequency k in a frame 1 with respect to a noisy power spectrum $|Y(k, l)|^2$. The voice enhancer 18 calculates a complex noise-free spectrum X'(k, l) by multiplying the obtained gain Gss(k, l) by the complex input spectrum Y(k, l) output from the power calculator 171. That is, the complex noise-free spectrum X'(k, l) represents a complex spectrum obtained by subtracting (suppressing) the noise power of the corresponding noise component from the complex input spectrum Y(k, l). The voice enhancer 18 transforms the calculated complex noise-free spectrum X'(k, l) into a time-domain noise-free signal x'(t). Here, the voice enhancer 18 performs, for example, an inverse discrete Fourier transform (IDFT) for the complex noise-free spectrum X'(k, l) for each frame 1 to calculate a noise-free signal x'(t). The voice enhancer 18 outputs the transformed noise-free signal x'(t) to the voice segment detecting unit 19. Note that the noise-free signal x'(t) is an audio signal obtained by suppressing the noise component estimated by the noise estimation unit 17 from the audio signal y(t) with a predetermined suppression amount.

Note that the voice enhancer 18 may suppress the noise component by performing spectral subtraction. In this case, the acoustic source separation unit 14 outputs voice signals separated on the basis of a frequency to the voice enhancer 18. In addition, the voice enhancer 18 may calculate the noise-free signal x'(t) through spectral subtraction by subtracting the noise power λ(k, l) output by the noise estimation unit 17 from the voice signal output by the acoustic source separation unit 14 on the basis of a frequency.

The voice segment detecting unit 19 detects a frame corresponding to a sound segment from the noise-free signal x'(t) output by the voice enhancer 18. The voice segment detecting unit 19 outputs the noise-free signal x'(t) of the frame corresponding to the detected sound segment to the voice recognition unit 20.

The voice recognition unit 20 performs voice recognition for the noise-free signal x'(t) output by the voice segment detecting unit 19 to recognize spoken content such as phoneme strings or words. The voice recognition unit 20 has a sound model such as a hidden Markov model (HMM) and a word dictionary. The voice recognition unit 20 calculates an acoustic feature value such as a static Mel-scale log spectrum (MSLS), a delta MSLS, and a single delta power for a subsidiary noise addition signal x'(t) periodically (for example, every 10 ms). The voice recognition unit 20 defines a vocal sound from the calculated acoustic feature value using the sound model and recognizes words from vocal sound strings of the defined vocal sound using the word dictionary. The voice recognition unit 20 outputs the recognition result to an external device (not shown). The external device is, for example, a car navigation system and the like.

Note that, although a single person speaks in the aforementioned example, the invention is not limited thereto. If a plurality of persons speak, the acoustic source localization unit 13, the acoustic source separation unit 14, the noise estimation unit 17, the voice enhancer 18, the voice segment detecting unit 19, and the voice recognition unit 20 perform the aforementioned processes for each person speaking.

Although the voice segment detecting unit 19 detects a sound segment in the aforementioned example, the voice segment detecting unit 19 may not detect the sound segment. In this case, the voice enhancer 18 may output the noise-free signal x'(t) to the voice recognition unit 20.

The voice recognition unit 20 may extract, for example, the MSLS as an acoustic feature value from the noise-free signal x'(t) output by the voice enhancer 18. Note that, the MSLS is obtained by performing an inverse discrete cosine transform for the Mel frequency cepstrum coefficient (MFCC) using a spectral feature value as a feature amount of the audio recognition. The voice recognition unit 20 may perform voice recognition on the basis of the extracted acoustic feature value.

<Processing Sequence of Audio Enhancement Device 1>

Next, an exemplary processing sequence performed by the audio enhancement device 1 will be described.

FIG. 3 is a flowchart illustrating a process performed by the audio enhancement device 1 according to this embodiment.

(Step S1) The audio signal obtaining unit 12 obtains N audio signals recorded by N microphones 101 of the sound receiving unit 11.

(Step S2) The acoustic source localization unit 13 performs acoustic source localization for the N audio signals input from the audio signal obtaining unit 12 using the transfer functions stored therein and, for example, the MUSIC method.

(Step S3) The acoustic source separation unit 14 reads a transfer function corresponding to the obtained azimuth angle out of the transfer functions stored therein. Subsequently, the acoustic source separation unit 14 separates the voice signal from read transfer function and the obtained N audio signals, for example, using the GHDSS-AS method.

(Step S4) The noise estimation unit 17 estimates the noise power λ(k, l) of the noise component contained in the voice signal on the basis of a frequency using a default cumulative histogram changed in response to the reset instruction output by the vehicle state monitor unit 15.

(Step S5) The voice enhancer 18 calculates the noise-free signal x'(t) with a noise component being suppressed by performing subtraction or a subtraction-like operation for each separated voice signal on the basis of a frequency by subtracting the noise power λ(k, l) output by the noise estimation unit 17 from the power spectrum $|Y(k, l)|^2$ output by the power calculator 171. As a result, the voice enhancer 18 suppresses the noise component relative to the voice signal.

(Step S6) The voice segment detecting unit 19 outputs the noise-free signal x'(t) of the frame corresponding to the sound segment to the voice recognition unit 20. Subsequently, the voice recognition unit 20 performs voice recognition for the noise-free signal x'(t) of the frame corresponding to the sound segment output by the voice segment detecting unit 19 using a technique known in the art.

The audio enhancement device 1 performs the aforementioned process for each frame, for example, while an ignition key of the vehicle 2 is in the on position.

<Histogram and Cumulative Histogram>

Next, a histogram and a cumulative histogram used by the noise estimation unit 17 will be described.

The noise estimator 172 calculates the noise power λ(k, l) using the HRLE method as described above. The HRLE method is a method of creating a histogram by counting frequency of each power at a certain frequency, calculating cumulative frequency by accumulating the frequency counted on the created histogram for the power, and defining power that satisfies a predetermined threshold value $S_x$ as noise power. The threshold value $S_x$ is a variable for defining noise power of background noise contained in the recorded audio signal. In other words, the threshold value $S_x$ is a control variable for controlling a suppression amount of the noise component subtracted (suppressed) by the voice enhancer 18. Therefore, a greater threshold value $S_x$ leads to greater estimated noise power, and a smaller threshold value $S_x$ leads to smaller estimated noise power.

Figure 4:
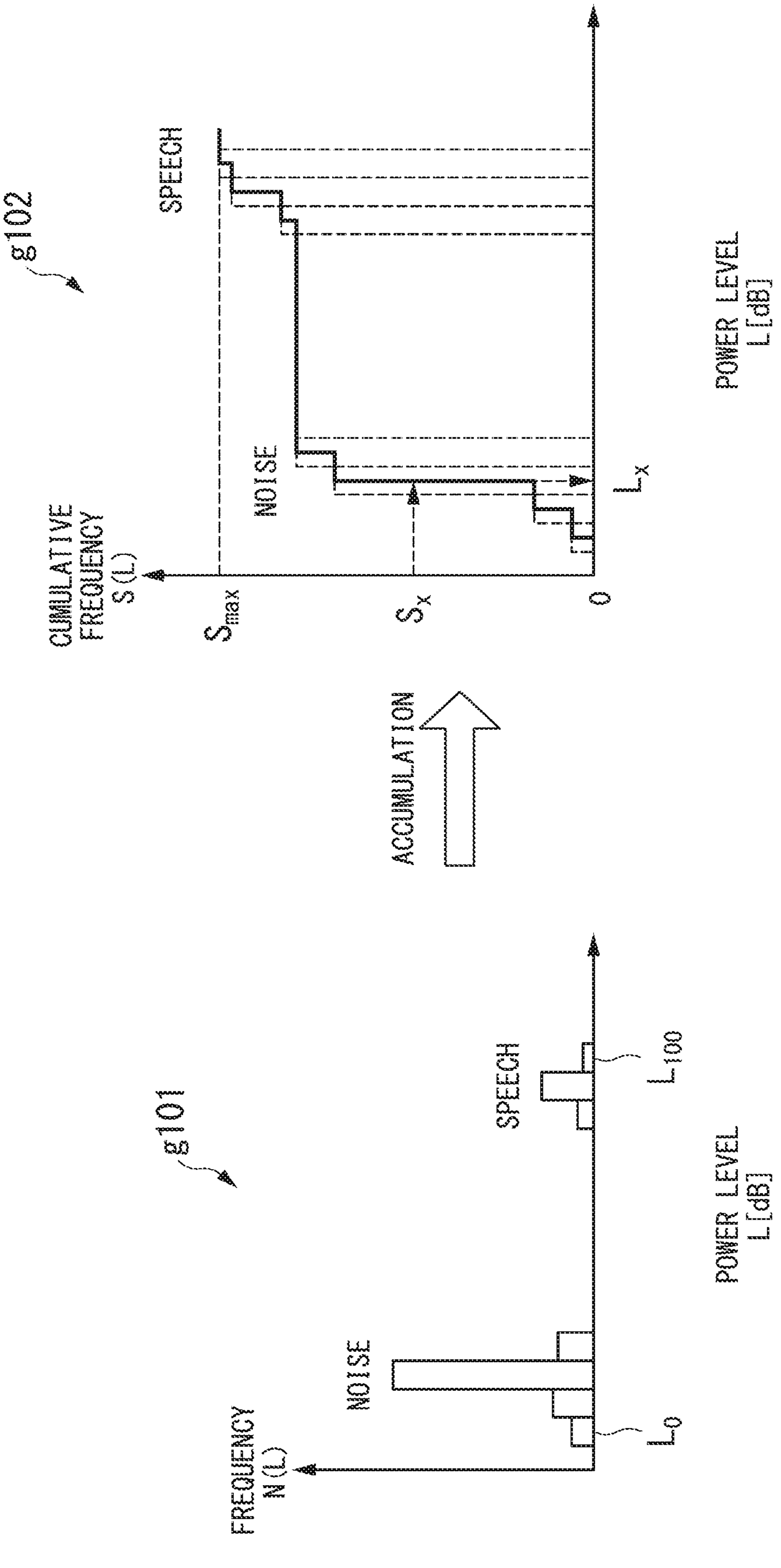
FIG. 4 illustrates a histogram when a difference between a power level of a noise component and a power level of a speech created by a histogram updater is significant and a cumulative histogram according to an embodiment.

FIG. 4 is a diagram illustrating a histogram and a cumulative histogram when a difference between a noise power level and a speech power level created by the histogram updater 173 according to this embodiment is significant. In the histogram g101 of FIG. 4, the horizontal axis denotes a power level L [dB], and the vertical axis denotes the number of power levels (also referred to as "frequency") N(L).

In the example of the histogram g101, "$L_0$" denotes a minimum value of the power level, and "$L_{100}$" denotes a maximum value of the power level. For example, in a vehicle state in which the power window and the door of the vehicle 2 are closed, and the brake is in a traveling state, a difference between the noise component (hereinafter, simply referred to as "noise") power level and the speech power level is significant as illustrated in the histogram g101. In addition, the histogram g101 shows frequency of each power interval on the basis of a frequency. The "frequency" refers to the number of events in which it is determined that the calculated power (spectrum) belongs to a certain power interval for each frame at a predetermined time period and is also called a "count of occurrences."

The histogram updater 173 creates a cumulative histogram g102 of FIG. 4 by sequentially accumulating the created histogram until a reset instruction is input. In the cumulative histogram g102, the horizontal axis denotes a power level L [dB], and the vertical axis denotes the accumulated count of the power levels (also referred to as "cumulative frequency") S(L). In addition, the subscript "x" of the power level "$L_x$" denotes a position on the horizontal axis of the cumulative histogram g102. In addition, the cumulative frequency S(L) shown in the cumulative histogram g102 is a value obtained by accumulating the frequency in the histogram g101 sequentially from the leftmost segment for each power interval. The cumulative frequency S(L) is also referred to as a "cumulative count."

Note that the threshold value $S_x$ may be a predetermined percentage (for example, x/100) with respect to the maximum cumulative frequency $S_{max}$ in the cumulative histogram. In this case, the histogram updater 173 may calculate the estimated noise power based on the magnitude of the power $L_x(t)$ corresponding to a predetermined percentage of the cumulative frequency.

Figure 5:
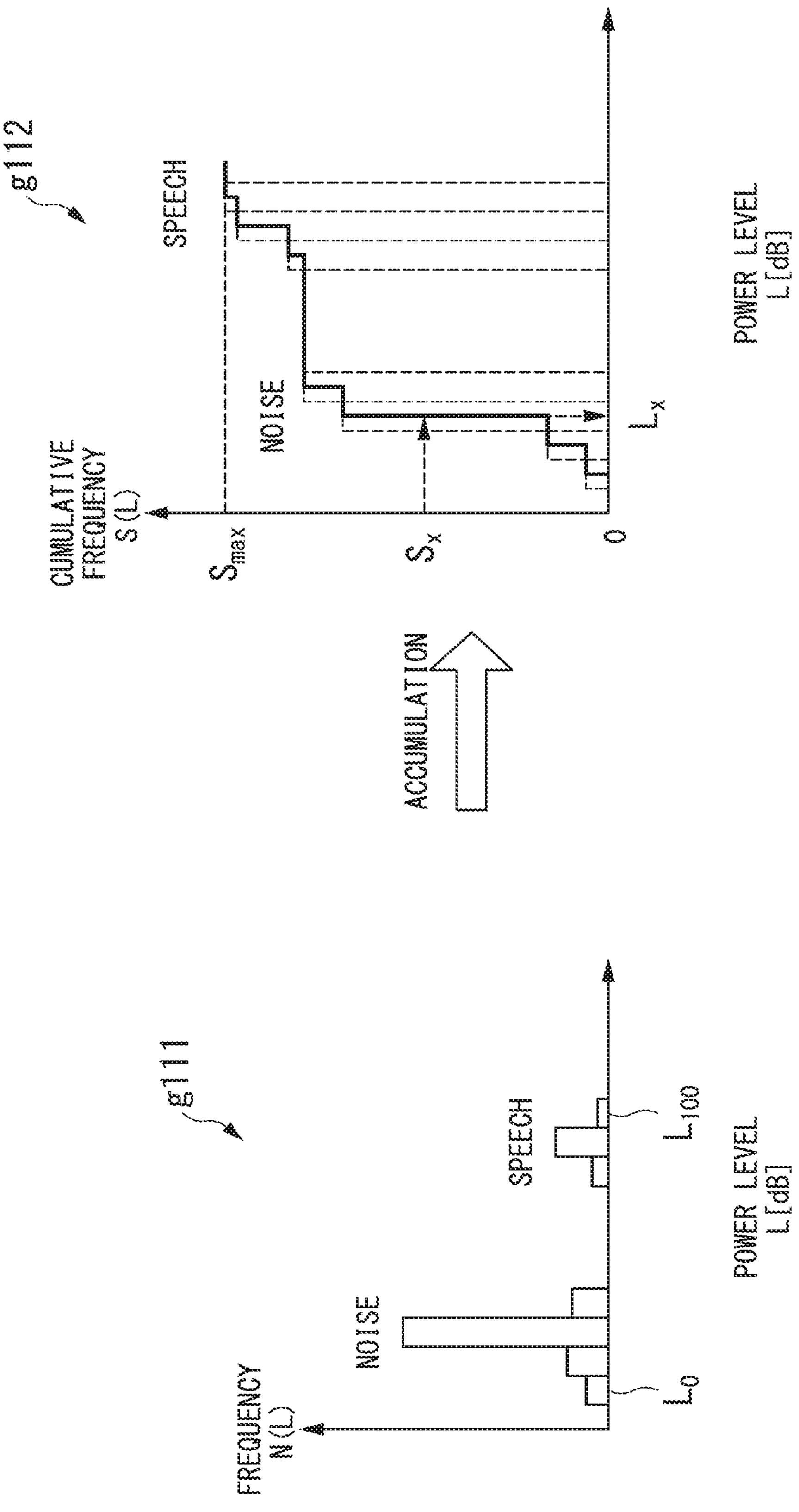
FIG. 5 illustrates a histogram when a difference between a power level of a noise component and a power level of a speech created by the histogram updater is insignificant and a cumulative histogram according to an embodiment.

FIG. 5 is a diagram illustrating a histogram and a cumulative histogram when a difference between a noise power level and a speech power level created by the histogram updater 173 according to this embodiment is insignificant. The horizontal axis and the vertical axis of the histogram g111 of FIG. 5 are similar to those of the histogram g101 of FIG. 4, and the horizontal axis and the vertical axis of the cumulative histogram g112 are similar to those of the histogram g102 of FIG. 4.

In a vehicle state in which the power window is opened, the noise power level increases compared to a case in which the power window is closed as illustrated in the histogram g111 of FIG. 5. Therefore, the difference between the noise power level and the speech power level is insignificant.

Note that the cumulative histogram g102 of FIG. 4 and the cumulative histogram g112 of FIG. 5 are plotted for a single frequency, and the frequency-based cumulative histograms are stored in the histogram memory unit 16 in combination with the vehicle state on the basis of a vehicle state. The cumulative histograms are created using a measurement result obtained by performing measurement for each vehicle state and each frequency in advance, and the created cumulative histograms are stored in the histogram memory unit 16 on the basis of a vehicle state and a frequency.

Here, an exemplary case in which the vehicle state is changed will be described.

For example, when a state is changed from a state in which a power window is closed to a state in which a power window is open, the noise power level increases. As a result, a shape of the cumulative histogram is changed from the cumulative histogram g102 of FIG. 4 to the cumulative histogram g112 of FIG. 5, and the threshold value $S_x$ for separating noise and speech is also changed. However, if the cumulative histogram of the state in which the power window is closed is updated and used after a state is changed to the state in which the power window is open, the cumulative histogram becomes unsuitable, and the threshold value $S_x$ becomes unsuitable accordingly. Therefore, it is difficult to properly estimate the noise power level.

For this reason, according to this embodiment, when the vehicle state is changed, the cumulative histogram used to estimate the noise component is reset to a default cumulative histogram corresponding to the vehicle state stored in the histogram memory unit 16. As a result, even when the vehicle state is changed, it is possible to properly estimate the noise power. Note that the cumulative histogram is changed on the basis of a frequency.

In the case of a plurality of vehicle states, the histogram updater 173 may select one of the vehicle states depending on a priority stored therein.

For example, in a state where the vehicle starts, a state in which a door is being closed, and a state in which a power window is open, the noise component increases because the power window is opened. Therefore, the histogram updater 173 selects a cumulative histogram DEFAULT 1 corresponding to the information in which the power window is open out of information regarding a plurality of vehicle states. In this manner, a priority of the vehicle state most predominantly affecting the noise component may be set to a highest priority.

Alternatively, for each set of the vehicle states, the default cumulative histogram, the magnitude relationship between the noise power and the speech power, and the threshold value $S_x$ may be associated with one another and be stored in the histogram memory unit 16.

<Noise Estimation Process>

Next, a noise estimation process performed by the noise estimator 172 and the histogram updater 173 will be described with reference to step S4 in FIG. 3.

Note that, in the following description, although a frequency factor is omitted for simplicity purposes of Formulas, variables other than parameters relate to a frequency function, and the same process is performed independently for each frequency. In addition, the noise estimator 172 repeats the following process until the next input of the reset instruction from the reset instruction input from the vehicle state monitor unit 15.

Figure 6:
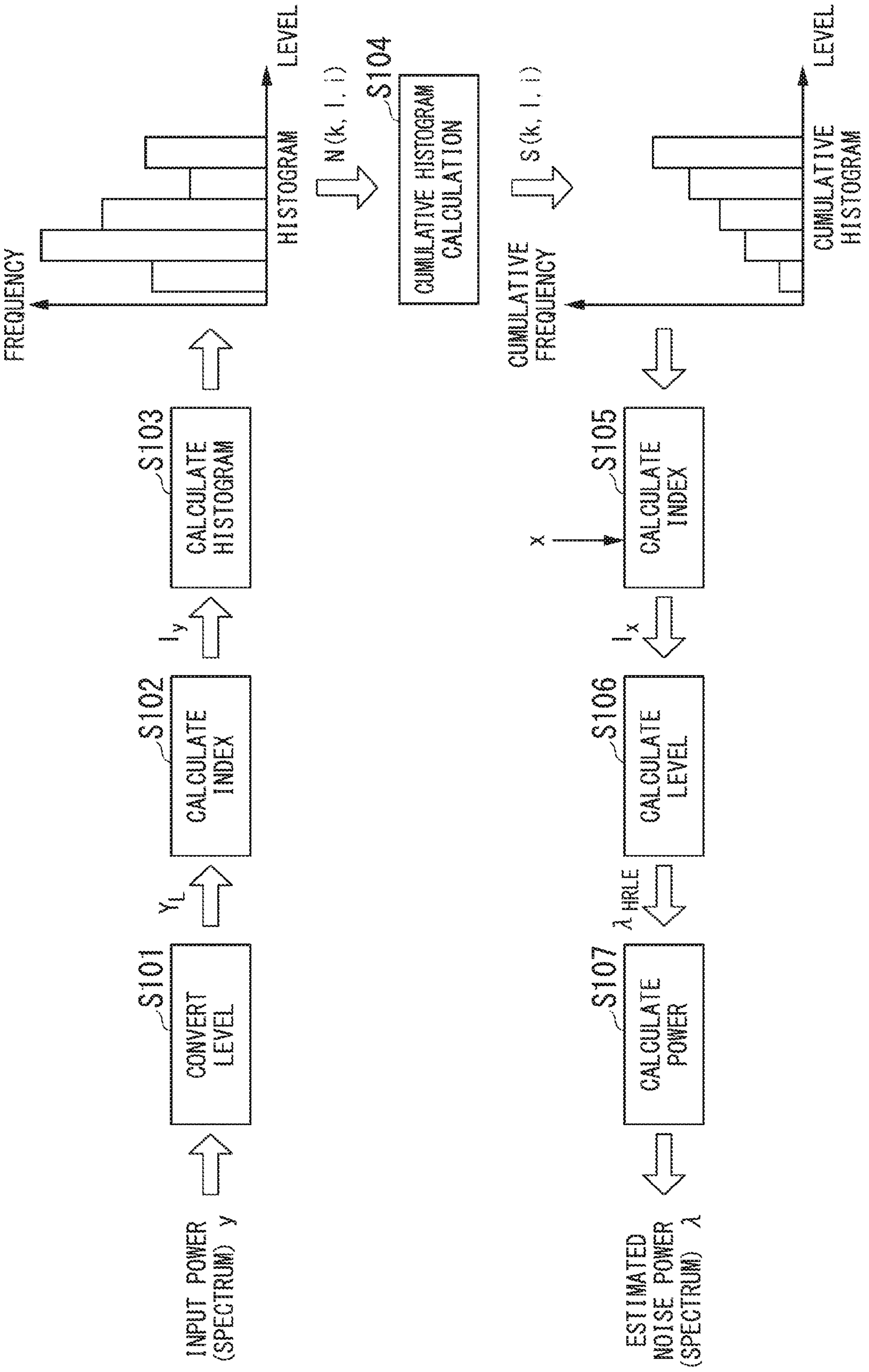
FIG. 6 is a diagram illustrating a processing sequence of a noise estimation unit according to an embodiment.

FIG. 6 is a diagram illustrating a processing sequence of the noise estimation unit 17 according to this embodiment.

(Step S101) The histogram updater 173 calculates a logarithm spectrum $Y_L(k, l)$ based on the power spectrum $|Y(k, l)|^2$ input from the power calculator 171 using the following Formula (2).

[Formula 2]

$$Y_L(k,l)=20\log_{10}|Y(k,l)| \quad (2)$$

(Step S102) The histogram updater 173 defines an index $I_y(k, l)$ to which the logarithm spectrum $Y_L(k, l)$ belongs using the following Formula (3). Note that the histogram updater 173 may transform the power into the index using a transform table in order to reduce a calculation amount.

[Formula 3]

$$I_y(k,l)=\text{floor}\left[\frac{(Y_L(k,l)-L_{min})}{L_{step}}\right] \quad (3)$$

Note that, in Formula (3), "floor( . . . )" denotes a floor function outputting a maximum integer smaller than a real number " . . . " or a number " . . . ". "$L_{min}$" denotes a minimum level of a predetermined logarithm spectrum $Y_L(k, l)$. "$L_{step}$" denotes a level width of one bin and a level width for each predetermined rank.

(Step S103) The histogram updater 173 calculates each frequency N(t,i) of the histogram using the following Formula (4).

[Formula 4]

$$N(k,l,i)=\alpha\cdot N(k,l-1,i)+(1-\alpha)\cdot\delta(i-I_y(k,l)) \quad (4)$$

In Formula (4), "α" denotes a time decay parameter. Here, the parameter α is set to "$\alpha=1-\{1/(T_rF_s)\}$." Here, "$T_r$" denotes a predetermined time constant, and "$F_s$" denotes a sampling frequency.

"δ( . . . )" denotes a Dirac's delta function. That is, the count of occurrences N(k, l, i) is obtained by adding "(1−α)" to a decayed value obtained by multiplying the count of occurrences N(k,l−1, i) of the rank $I_y$(k, l) of the previous frame (l−1) by the parameter α. As a result, the count of occurrences N(k, l, $I_y$(k, l)) for the rank $I_y$(k, l) is added.

(Step S104) The histogram updater 173 adds the count of occurrences N(k, l, i) from the lowest rank 0 to the rank i and calculates a cumulative count S(k, l, i) using the following Formula (5) to create and update the cumulative histogram.

[Formula 5]

$$S(k, l, i) = \sum_{p=0}^{i} N(k, l, p) \tag{5}$$

In the cumulative histogram created in this manner, smaller weights are given to older data.

(Step S105) The noise estimator 172 reads the threshold value $S_x$ depending on a vehicle state from the histogram memory unit 16. Subsequently, the noise estimator 172 defines the rank i that results in a cumulative count S(k, l, i) closest to the cumulative count S(k, l, $I_{max}$)·$S_x$ corresponding to the threshold value $S_x$ as an estimated rank $l_x$(k, l) using the following Formula (6). Note that the threshold value $S_x$ may be set to the same value even when the vehicle state is different.

[Formula 6]

$$I_x(k,l)=\arg\min_i [S(k,l,I_{max})\cdot S_x - S(s,k,i)] \tag{6}$$

In Formula (6), "arg $\min_i$[ . . . ]" denotes a function that outputs "i" capable of setting the number " . . . " to the minimum.

(Step S106) The noise estimator 172 reads the magnitude relationship between the speech power and the noise power stored in the histogram memory unit 16 depending on the vehicle state. Subsequently, the noise estimator 172 converts the estimated rank $l_x$(k, l) to the logarithmic level $\lambda_{HRLE}$(k, l) using the following Formula (7).

[Formula 7]

$$\lambda_{HRLE}(k,l)=L_{min}+L_{step}\cdot I_x(k,l) \tag{7}$$

(Step S107) The noise estimator 172 calculates the noise power λ(k, l) transformed to a linear region using the following Formula (8).

[Formula 8]

$$\lambda(k, l) = 10^{\frac{\lambda_{HRLE}(k,l)}{20}} \tag{8}$$

Note that, although the histogram is calculated in step S103, and the cumulative histogram is then calculated in step S104 in the aforementioned example, the invention is not limited thereto. The histogram updater 173 may directly calculate and update the cumulative histogram by applying Formula (4) to Formula (5) in step S104 without processing step S103.

The values of the parameters $L_{min}$, $L_{step}$, and $I_{max}$ are set to, for example, −100 dB, 0.2 dB, and 1000, respectively. In addition, the time constant $T_r$ is set to, for example, 10 seconds. These parameters may be set differently in each default cumulative histogram.

<Processing Sequence of Reset, Change, and Update Operations of Cumulative Histogram>

Next, a processing sequence of the reset, change, and update operations of the cumulative histogram performed by the histogram updater 173 will be described.

Figure 7:
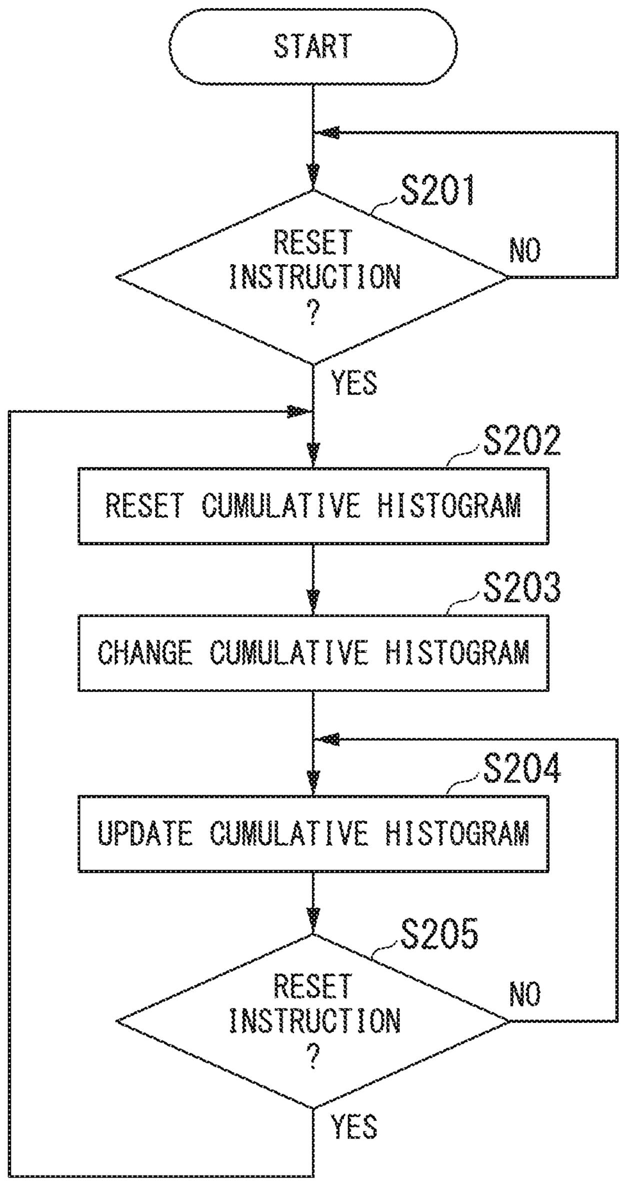
FIG. 7 is a flowchart illustrating a reset process, a change process, and an update process for the cumulative histogram performed by the histogram updater according to an embodiment.

FIG. 7 is a flowchart illustrating the reset, change, and update operations of the cumulative histogram performed by the histogram updater 173 according to this embodiment.

(Step S201) The histogram updater 173 determines whether or not a reset instruction is input from the vehicle state monitor unit 15. If it is determined that the reset instruction is input (YES in step S201), the histogram updater 173 advances the process to step S202. If it is determined that no reset instruction is input (NO in step S201), the process of step S201 is repeated.

(Step S202) The histogram updater 173 resets the cumulative histogram.

(Step S203) The histogram updater 173 reads a default cumulative histogram corresponding to the vehicle state contained in the reset instruction from the histogram memory unit 16. Subsequently, the histogram updater 173 changes the cumulative histogram used in estimation of the noise component into the read default cumulative histogram.

(Step S204) The histogram updater 173 updates the cumulative histogram changed in step S203 on the basis of the separated voice signal.

(Step S205) The histogram updater 173 determines whether or not a reset instruction is input from the vehicle state monitor unit 15. If it is determined that the reset instruction is input (YES in step S205), the histogram updater 173 returns the process to step S202. If it is determined that no reset instruction is input (NO in step S205), the histogram updater 173 returns the process to step S204.

Note that the histogram updater 173 sequentially performs the processes of steps S201 to S205, for example, for each frame.

<Examples of Reset, Change, and Update Timings of Cumulative Histogram Depending on Vehicle State>

Next, a specific example of reset, change, and update timings of the cumulative histogram depending on a vehicle state will be described.

Figure 8:
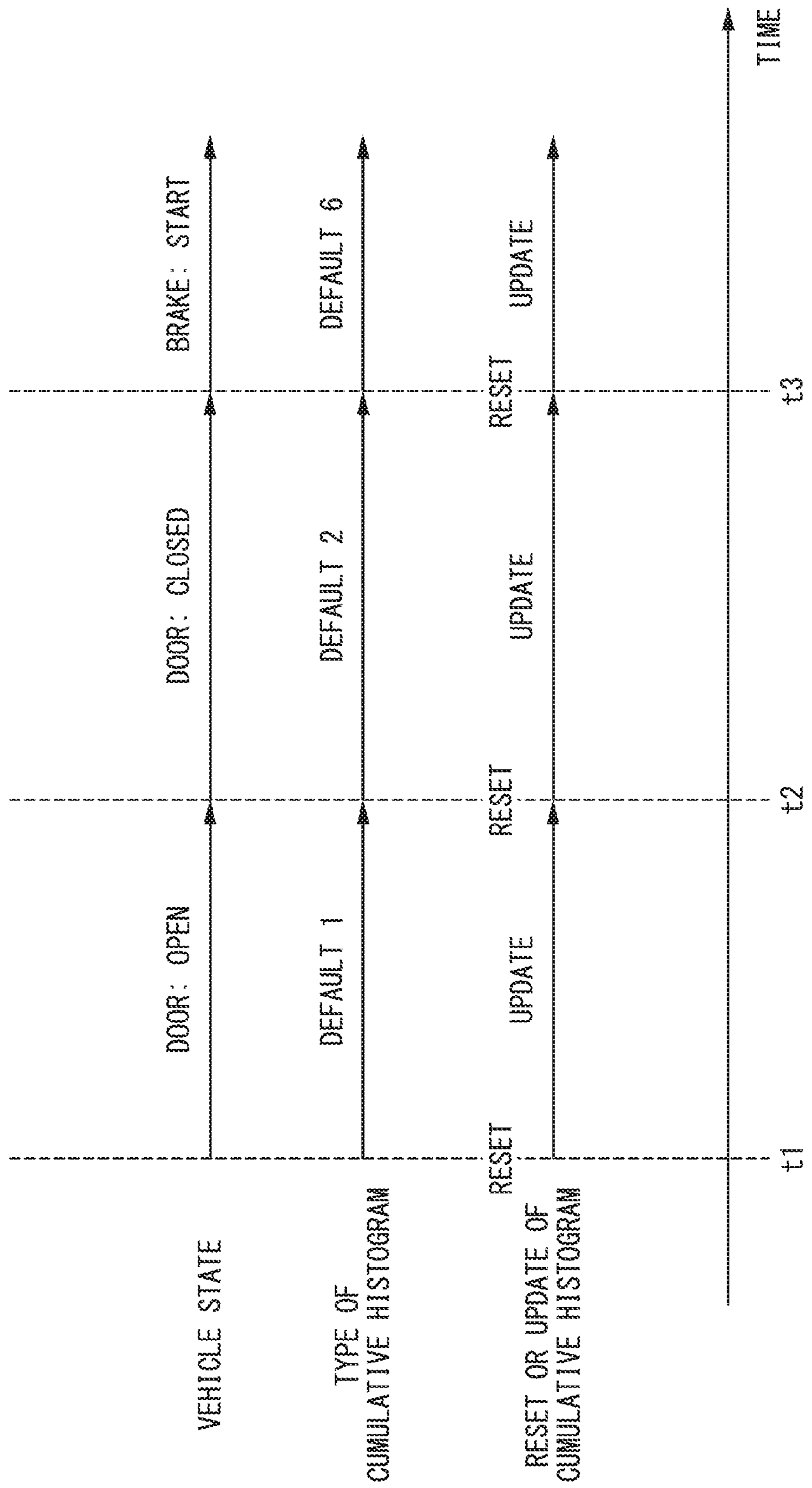
FIG. 8 is a diagram illustrating timings of resetting, changing, and updating the cumulative histogram depending on a vehicle state according to an embodiment.

FIG. 8 is a diagram illustrating reset, change, and update timings of the cumulative histogram depending on a vehicle state according to this embodiment. In FIG. 8, the horizontal axis denotes time.

In the example of FIG. 8, the door is opened at the time t1, the door is closed at the time t2, and the vehicle 2 starts at the time t3.

At the time t1, the histogram updater 173 resets the frequency-based cumulative histogram in response to the reset instruction output from the vehicle state monitor unit 15. Subsequently, the histogram updater 173 reads the frequency-based cumulative histogram of DEFAULT 1 (FIG. 2) from the histogram memory unit 16 depending on the vehicle state information contained in the reset instruction output by the vehicle state monitor unit 15 and changes the frequency-based cumulative histogram to the read frequency-based cumulative histogram of DEFAULT 1.

During the time period t1 to t2, the histogram updater 173 updates the frequency-based cumulative histogram of DEFAULT 1 on the basis of the separated voice signal. The noise estimator 172 estimates the noise power level using the updated frequency-based cumulative histogram of DEFAULT 1 on the basis of a frequency.

At the time t2, the histogram updater 173 resets the frequency-based cumulative histogram in response to the reset instruction output from the vehicle state monitor unit 15. Subsequently, the histogram updater 173 reads the frequency-based cumulative histogram of DEFAULT 2 (FIG. 2) from the histogram memory unit 16 depending on the vehicle state information contained in the reset instruction output by the vehicle state monitor unit 15 and changes the frequency-based cumulative histogram from DEFAULT 1 to DEFAULT 2.

During the time period t2 to t3, the histogram updater 173 updates the frequency-based cumulative histogram of DEFAULT 2 on the basis of the separated voice signal. The noise estimator 172 estimates the noise power level using the updated frequency-based cumulative histogram of DEFAULT 2 on the basis of a frequency.

At the time t3, the histogram updater 173 resets the frequency-based cumulative histogram in response to the reset instruction output from the vehicle state monitor unit 15. Subsequently, the histogram updater 173 reads the frequency-based cumulative histogram of DEFAULT 6 (FIG. 2) from the histogram memory unit 16 depending on the vehicle state information contained in the reset instruction output by the vehicle state monitor unit 15 and changes the frequency-based cumulative histogram from DEFAULT 2 to DEFAULT 6.

After the time t3, the histogram updater 173 updates the frequency-based cumulative histogram of DEFAULT 6 on the basis of the separated voice signal until the next reset instruction is input.

The noise estimator 172 estimates the noise power level using the updated frequency-based cumulative histogram of DEFAULT 6 on the basis of a frequency.

By outputting a voice recognition result for an audio signal with the noise component being suppressed in this manner, for example, to a car navigation system, it is possible to control the operation of the car navigation using the noise-suppressed voice signal.

As described above, the audio enhancement device 1 according to this embodiment includes the sound receiving unit 11 configured to receive an audio signal, the vehicle state monitor unit 15 configured to monitor a vehicle state, the noise estimation unit 17 configured to estimate the noise component for each frequency component using a cumulative histogram for each frequency component obtained by accumulating the frequency of the power of the audio signal received by the sound receiving unit, and the voice enhancer 18 configured to suppress the noise component for each frequency component estimated by the noise estimation unit from the received audio signal. The noise estimation unit resets the cumulative histogram on the basis of the monitoring result of the vehicle state monitor unit.

In this configuration, the audio enhancement device 1 according to this embodiment resets the cumulative histogram used in noise estimation on the basis of the vehicle state monitoring result. As a result, the audio enhancement device 1 according to this embodiment estimates noise using the reset cumulative histogram depending on a vehicle state, for example, when the power of the vehicle 2 is turned on with an ignition key. Thereby, there is no influence from the past updated cumulative histogram. As a result, in the audio enhancement device 1 according to this embodiment, it is possible to properly perform noise suppression even when the vehicle state is changed.

In addition, in the audio enhancement device 1 according to this embodiment, the noise estimation unit 17 resets the cumulative histogram when the monitoring result of the vehicle state monitor unit 15 is changed.

In this configuration, the audio enhancement device 1 according to this embodiment resets the cumulative histogram used in noise estimation when the vehicle state is changed. As a result, when the vehicle state is changed, the audio enhancement device 1 according to this embodiment performs noise estimation using the reset cumulative histogram instead of the former cumulative histogram before the change of the vehicle state. As a result, the audio enhancement device 1 according to this embodiment can properly perform noise suppression even in an environment in which the noise state inside the vehicle 2 is changed.

The audio enhancement device 1 according to this embodiment includes the histogram memory unit 16 that stores the cumulative histograms on the basis of a vehicle state. The noise estimation unit 17 reads the cumulative histograms (DEFAULT 1, 2, . . . ) for each frequency component depending on the vehicle state from the histogram memory unit on the basis of the monitoring result of the vehicle state monitor unit 15 after the reset operation. Then, the noise estimation unit 17 estimates noise components for each frequency component using the read cumulative histograms for each frequency component.

In this configuration, the audio enhancement device 1 according to this embodiment estimates the noise component using the cumulative histogram depending on the vehicle state. Therefore, it is possible to properly suppress noise even in an environment in which the noise state inside the vehicle 2 is changed. In addition, the audio enhancement device 1 according to this embodiment can perform noise estimation using the cumulative histograms for each vehicle state stored in advance in the histogram memory unit 16 without creating a new cumulative histogram from the histograms when the vehicle state is changed. As a result, the audio enhancement device 1 according to this embodiment can properly perform noise suppression immediately using the cumulative histogram stored in the histogram memory unit even when the environment is changed.

In the audio enhancement device 1 according to this embodiment, the histogram memory unit 16 stores the threshold value $S_x$ for determining the noise component in the cumulative histogram in combination with the vehicle state. The noise estimation unit 17 estimates the noise component for each frequency component using the threshold value stored in the histogram memory unit.

In this configuration, the audio enhancement device 1 according to this embodiment can properly estimate power of the noise component using the threshold value $S_x$ predetermined for each vehicle state. As a result, the audio enhancement device 1 according to this embodiment can properly perform noise suppression even when a magnitude relationship between the noise power and the speech power is changed.

In the audio enhancement device 1 according to this embodiment, the vehicle state in which the cumulative histogram is reset includes a state in which the vehicle 2 performs at least one of start or stop operations.

In the audio enhancement device 1 according to this embodiment, the vehicle state in which the cumulative histogram is reset includes states in which the door of the vehicle 2 is opened and closed.

In the audio enhancement device 1 according to this embodiment, the vehicle state in which the cumulative histogram is reset includes states in which the window of the vehicle 2 is opened and closed.

In this configuration, the audio enhancement device 1 according to this embodiment resets the cumulative histogram and estimates the noise component when the vehicle 2 performs at least one of the start operation, the stop operation, the door open/close operation, and the window open/close operation. As a result, in the audio enhancement device 1 according to this embodiment, it is possible to properly perform noise suppression even in an environment in which the magnitude relationship of the noise component inside the vehicle 2 is changed due to the vehicle state.

According to this embodiment, a single cumulative histogram is stored in the histogram memory unit 16 for each vehicle state and for each frequency. However, the invention is not limited thereto. For example, a first cumulative histogram corresponding to a driver's seat and a cumulative histogram corresponding to an assistant driver's seat may be recorded in the histogram memory unit 16. As a result, it is possible to optimally suppress the noise component depending on a person seated in the driver's seat or the assistant driver's seat.

Note that, although the audio enhancement device 1 is installed in the vehicle 2 according to this embodiment, the invention is not limited thereto. Any environment in which a relationship between the noise power and the speech power is changed may be employed. For example, the audio enhancement device 1 may be applied to a train, an airplane, a ship, a room in a house, a shop, and the like For example, when the audio enhancement device 1 is applied to a shop, the noise power is changed depending on a door open/closed state of the shop. Even in such an environment, according to this embodiment, it is possible to properly perform noise suppression even when the magnitude relationship of the noise component is changed.

For example, when the audio enhancement device 1 is applied to a room of a house having different noise components in each room, the cumulative histograms for each room are stored in the histogram memory unit 16. Therefore, it is possible to perform noise suppression suitable for each room. As a result, according to this embodiment, it is possible to control, for example, home appliances inside a house using an audio signal having noise properly suppressed.

Alternatively, part of or all of the elements of the audio enhancement device 1 of the present embodiment may be implemented using a smart phone, a mobile terminal, a mobile game device, and the like. If the audio enhancement device 1 has a communication capability, for example, the histogram memory unit 16 may be stored in a remote server via a network.

A program capable of implementing functionalities of the audio enhancement device 1 according to the present invention may be recorded in a computer readable recording medium, and noise estimation, voice enhancement, and the like may be performed by causing a computer system to read and execute the program recorded in this recording medium. The terminology "computer system" used herein refers to software such as an operating system (OS) or hardware devices such as peripherals. In addition, the "computer system" may also include a world wide web (WWW) system capable of providing a website environment (or a display environment). Further, the terminology "computer readable recording media" refers to portable media such as a flexible disk, a magneto-optical disc, a read-only memory (ROM), and a compact disc (CD) ROM, and a storage device built in the computer system such as a hard disk. Moreover, the "computer readable recording media" include media capable of maintaining the program during a certain period of time, such as a volatile memory (random-access memory (RAM)) inside the computer system serving as a server or a client when the program is transmitted via network such as the Internet or a communication line such as a telephone line.

The program may be transmitted from the computer system in which the program is stored in, for example, the storage device, to another computer system through transmission media or transmission waves in the transmission media. Here, the terminology "transmission media" for transmitting the program refers to media having a function of transmitting information like a network (communication network) such as the Internet or a communication circuit (communication line) such as a telephone line. Furthermore, the program may also include a program for implementing part of the aforementioned functionalities and include a so-called differential file (differential program) in which the aforementioned functionalities are implemented in combination with a program that has already been recorded in the computer system.

While preferred embodiments of the invention have been described and illustrated hereinbefore, it should be understood that they are only for exemplary purposes and are not to be construed as limiting. Any addition, omission, substitution, or modification may be possible without departing from the scope of the present invention. Accordingly, the invention is not to be considered as being limited by the foregoing description, and is only limited by the scope of the appended claims.

The invention claimed is:

1. A voice enhancement device comprising:

a sound receiver configured to receive an audio signal;

a vehicle state monitor configured to monitor a vehicle state;

a noise estimator configured to estimate a noise component for each frequency component using a cumulative histogram created by accumulating frequency of power of the audio signal received by the sound receiver for each frequency component;

a voice enhancer configured to suppress the noise component for each frequency component estimated by the noise estimator in the received audio signal; and a memory configured to store the cumulative histogram on the basis of the vehicle state, wherein the noise estimator resets the cumulative histogram on the basis of a monitoring result of the vehicle state monitor, and subsequently reads the cumulative histogram for each frequency component depending on the vehicle state from the memory on the basis of the monitoring result of the vehicle state monitor and estimates the noise component for each frequency component using the read cumulative histogram for each frequency component.

2. The voice enhancement device according to claim 1, wherein the noise estimator resets the cumulative histogram when the monitoring result of the vehicle state monitor is changed.

3. The voice enhancement device according to claim 1, wherein the memory stores a threshold value for determining the noise component on the cumulative histogram in combination with the vehicle state, and the noise estimator estimates the noise component for each frequency component using the threshold value stored in the memory.

4. The voice enhancement device according to claim 1, wherein the vehicle state in which the cumulative histogram is reset includes at least one of a start operation and a stop operation of the vehicle.

5. The voice enhancement device according to claim 1, wherein the vehicle state in which the cumulative histogram is reset includes a door open/close operation of the vehicle.

6. The voice enhancement device according to claim 1, wherein the vehicle state in which the cumulative histogram is reset includes a window open/close operation of the vehicle.

7. A voice enhancement method comprising:

(a) receiving, by a sound receiver, an audio signal;

(b) monitoring, by a vehicle state monitor, a vehicle state;

(c) estimating, by a noise estimator, a noise component for each frequency component using a cumulative histogram for each frequency component created by accumulating frequency of power of the audio signal received in (a), resetting the cumulative histogram on the basis of a result monitored in (b), subsequently reading the cumulative histogram for each frequency component depending on the vehicle state from a memory on the basis of the monitoring result of the vehicle state monitor, and estimating the noise component for each frequency component using the read cumulative histogram for each frequency component; and (d) suppressing, by a voice enhancer, the noise component for each frequency component estimated by the noise estimator in the audio signal received in (a).

* * * * *